United States Patent [19]

Spiess

[11] 3,927,098

[45] Dec. 16, 1975

[54] PROCESS FOR THE PREPARATION OF 2-AMINO-4-NITRO-ANISOLE

[75] Inventor: Bernhard Spiess, Offenbach (Main), Germany

[73] Assignee: Hoechst Aktiengesellschaft, Frankfurt am Main, Germany

[22] Filed: Nov. 12, 1973

[21] Appl. No.: 414,633

[30] Foreign Application Priority Data

Nov. 16, 1972 Germany.............................. 2256169

[52] U.S. Cl. .............................................. 260/575
[51] Int. Cl.² ................. C07C 91/40; C07C 91/42; C07C 93/14
[58] Field of Search ..................................... 260/575

[56] References Cited
UNITED STATES PATENTS 1,998,794   4/1935   Tinker et al. ........................ 260/575
2,525,508   10/1950   Zimmerman........................ 260/575

*Primary Examiner*—Paul F. Shaver
*Attorney, Agent, or Firm*—Connolly and Hutz

[57] ABSTRACT

An improved process for preparing a very pure 2-amino-4-nitro-anisole which represents a known starting compound for producing water-insoluble azo dyestuffs, by nitration of 2-aminoanisole which is characterized by heating, after nitration and dilution of the reaction mixture, the diluted medium to about 50° to 100°C, subsequently adjusting it with ammonia to a pH-value of about 0.6 to 1.6, clarifying it by filtration and isolating the 2-amino-4-nitroanisole by addition of ammonia to a pH-value of about 2.5.

1 Claim, No Drawings

PROCESS FOR THE PREPARATION OF 2-AMINO-4-NITRO-ANISOLE

The present invention relates to an improved process for preparing 2-amino-4-nitroanisole by nitration of 2-aminoanisole.

2-Amino-4-nitroanisole is found in commerce under the term of "Echtscharlach R Base" (Colour Index, Third Edition, C.I. 37 130) and is used for producing waterinsoluble azo dyestuffs on the fibre according to the ice colour technique.

A known process for preparing the compound consists in converting the 2-aminoanisole into the nitrate, introducing the nitrate at low temperature into concentrated sulfuric acid and separating the 2-amino-4-nitroanisole as hydrochloride (cf. BIOS 986, volume I, page 271). Then the hydrochloride is decomposed to give the free 2-amino-4-nitroanisole.

Furthermore the compound can be prepared by nitration of N-acetyl-o-anisidine. But it is obtained only as a by-product. Therefore, the process is only interesting on an industrial scale if the main product, the isomeric 2-amino-5-nitro-anisole, will be wanted, too. Furthermore, this process requires the hydrolysis of the acetyl group by boiling and a complicated isolation of an intermediate compound (cf. BIOS 986, volume I, page 278).

According to the process of U.S. Pat. Specification No. 1 998 794 the o-anisidine is dissolved in concentrated sulfuric acid and nitrated at about 0° to 5°C. After diluting with water, an arylsulfonic acid, for example naphtalene-1,5-disulfonic acid, is added and the sparingly soluble salt of the nitro-anisidine with the arylsulfonic acid precipitates. This salt is filtered and converted into the amine by treatment with aqueous alkali. Since an excess of arylsulfonic acid is required to precipitate the intermediate compound, a loss of this acid is inevitable. Moreover, the recovering of the arylsulfonic acid lessens the economic importance of the process.

According to the process of U.S. Pat. Specification No. 2 525 508, o-anisidine and the nitrating agent are added simultaneously, the hydrochloride is isolated and the 2-amino-4-nitroanisole is freed with alkali. The quality of the product thus obtained is inferior to that of the product obtained by means of the arylsulfonate.

It has now been found that the preparation of 2-amino-4-nitroanisole by nitration of 2-aminoanisole can be considerably simplified and that a very pure 2-amino-nitroanisole can be obtained by heating, after nitration and dilution of the reaction mixture with water, the diluted medium to about 50° to 100°C, subsequently adjusting with ammonia to a pH-value of about 0.6 to 1.6 and isolating the 2-amino-4-nitroanisole after a clarifying filtration.

The process of the invention is carried out by introducing, for example, the 2-aminoanisole into concentrated sulfuric acid and nitrating with nitrating acid. However, 2-aminoanisole and nitration acid can also be added simultaneously.

Instead of the nitration acid (nitric acid-sulfuric acid-mixture), for example anhydrous nitric acid or salts of the nitric acid, for example potassium nitrate, can also be used. But the amount of nitration agent shall be approximatively equivalent to the amount of 2-aminoanisole, and the nitration temperature shall not exceed +5°C. Then the whole is diluted with water, whereby at least the double weight of water is used.

Then the mixture is heated to about 50° – 100°C, whereby the diazonium compound formed as by-product is destroyed. At 100°C the destruction of the diazonium compound proceeds more quickly, but heating and cooling takes more time. The addition of copper salts accelerates decomposition.

Then a pH-value is adjusted to 0.6 – 1.6 by addition of ammonia at temperatures of from 20° to advantageously 70°C. In the subsequent clarifying filtration advantageously filter auxiliaries, such as kieselguhr or adsorption agents such as charcoal or bleaching earth, are added.

After the clarifying filtration, the 2-amino-4-nitroanisole is separated by addition of ammonia to a pH-value of about 2,5, isolated and dried. Instead of the ammonia other bases such as sodium hydroxide, sodium carbonate or potassium hydroxide, can be used with this isolation step. Ammonia can also be introduced as gas.

According to the process of the invention in which the elimination of intermediate compounds (hydrochlorides or arylsulfonates) is not carried out, a pure 2-amino-4-nitroanisole is obtained that yields clear dye-baths in the diazotation and is, therefore, especially suitable for producing ice colours. Furthermore, the expenditure of time, apparatus and chemical products is less great, so that it is more economical than the known processes. Moreover, no strongly acidic waste waters are obtained, so that the dressing of waste is also less complicated. Thus, the process represents a considerable enrichment and progress of technics.

The following Example illustrate the invention.

EXAMPLE 1,26 kg of a 95 % sulfuric acid were introduced into a glass vessel or refined steel vessel having a contents of 2,5 liters. At 15°–20°C, 0,42 kg of 2-aminoanisole was added dropwise while stirring well. Stirring was continued until complete dissolution, and the mixture was cooled to 0°C. At 0° – 5°C, 0,65 kg of nitration acid (content of nitric acid 30 %) was introduced. The nitration mixture was then poured into a 12 liter flask which contained 6,3 liters of water. The temperature increased to about 35°C. Then 20 g of charcoal were added, the solution was heated to 60°C, and the temperature was maintained until diazonium compounds could no longer be detected (examination with an alkaline "H-acid" coupling component solution); this stirring process took about 3 hours. The mixture was cooled to 45°C and at 45° – 50°C, 1,2 kg of aqueous ammonia (content of about 25 % of $NH_3$) were introduced, whereby a pH-value of about 0.9 was adjusted. Then 10 g of kieselguhr and 10 g of charcoal were added, and the mixture was filtered. The filtrate was slowly mixed with about 1,2 kg of aqueous ammonia (content of about 25 % of $NH_3$) until a pH-value of 2,5 was reached. Then the mixture was cooled, suction-filtered and dried. 398 g of 2-amino-4-nitro-anisole corresponding to 69 % of the theory were obtained.

What I claim is:

1. In the process for the preparation of 2-amino-4-nitroanisole by nitration of 2-aminoanisole with subsequent isolation of the 2-aminoanisole by means of a base, the improvement which comprises diluting the nitration mixture with water after the nitration process, heating the diluted solution to about 50°–100°C, subsequently adjusting the solution with ammonia to a pH value of 0.6 to 1.6 and isolating the 2-amino-4-nitroanisole after clarifying filtration without intermediate isolation of an intermediate salt.

* * * * *